No. 694,959. Patented Mar. 11, 1902.
A. GRAY.
VARIABLE SPEED GEAR.
(Application filed Feb. 27, 1901.)
(No Model.)

Witnesses
E. A. Balloch
Robert Ellsworth

Inventor
Alexander Gray
by his Attorney
Baldwin, Davidson & Wight

UNITED STATES PATENT OFFICE.

ALEXANDER GRAY, OF SUTTON, ENGLAND.

VARIABLE-SPEED GEAR.

SPECIFICATION forming part of Letters Patent No. 694,959, dated March 11, 1902.

Application filed February 27, 1901. Serial No. 49,058. (No model.)

*To all whom it may concern:*

Be it known that I, ALEXANDER GRAY, gentleman, a subject of the King of Great Britain, residing at Sharrow, Holland road, Sutton, in the county of Surrey, England, have invented certain new and useful Improvements in Variable-Speed Gear, of which the following is a specification.

In variable-speed gear constructed according to this invention two shafts to be geared together are so mounted that they can be brought into positions either in a line with or eccentric to one another. Two wheels or bosses of different diameters are fixed to these shafts. One has ratchet-teeth formed around its circumference and the other carries around its circumference a number of pawls adapted to engage with the ratchet-teeth whether the two shafts are in positions concentric with or eccentric to one another. When the shafts are concentric, any pawl which engages with the ratchet-teeth will remain engaged with them and the two shafts will then revolve at the same speed. When the shafts are eccentric to one another, then the pawls can only engage with the ratchet-teeth when they are brought around to where the circumferences of the two bosses or wheels are nearer to one another and become disengaged from them as they are carried around to the opposite side, where the circumferences are farther apart. Thus the pawls and ratchet-teeth then act after the manner of the teeth of gear-wheels and one shaft will revolve faster or slower than the other, according as the shafts are more or less eccentric to one another. In all cases the driven shaft is free to run on in the direction of the motion imparted to it independently of the driving-shaft. Thus the gear serves not only as a variable-speed gear, but also as a free wheel-gear.

Figure 1:
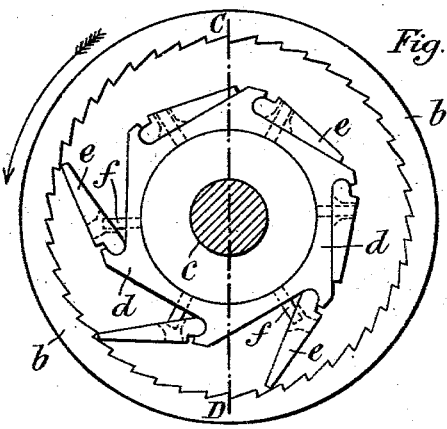
Figure 2:
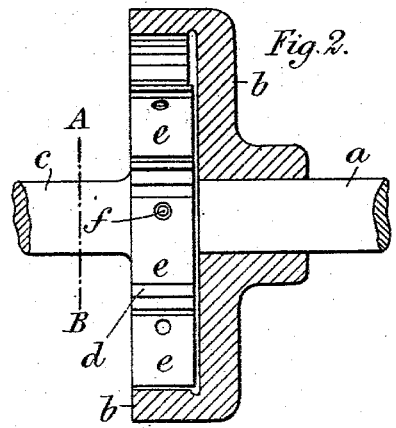
Figure 3:
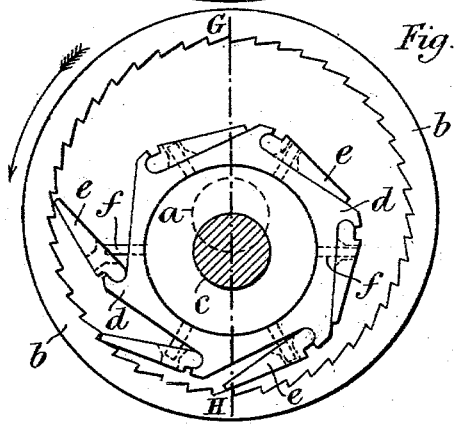
Figure 4:
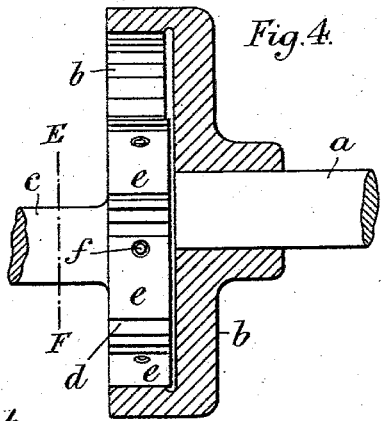
Figure 5:
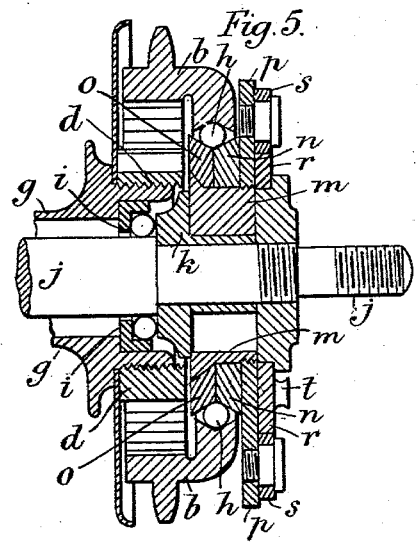

In the drawings annexed, Figures 1 to 4 show various views of two shafts thus geared together. In Figs. 1 and 2 the two shafts are concentric. In Figs. 3 and 4 they are eccentric. Fig. 1 is a section on the line A B, Fig. 2. Fig. 2 is a section on the line C D, Fig. 1. Fig. 3 is a section on the line E F, Fig. 4; and Fig. 4 is a section on the line G H, Fig. 3. Fig. 5 is a section, and Fig. 6 a side elevation, of similar driving-gear adapted for driving the rear wheel of a bicycle.

In Figs. 1 to 4, $a$ is a shaft, upon which is fixed a wheel $b$, which has ratchet-teeth cut around its inner circumference. $c$ is a shaft, upon which is fixed a boss $d$, which carries a series of pawls $e$ around its circumference. $f$ represents pins projecting from the boss and passing into holes in the pawls to keep them in place. The end of each pawl which is jointed to the boss is rounded and the boss is formed with a corresponding socket for this rounded end to turn in. The pawls can, as shown, lie flat against the boss or turn outward at an angle until their outward movement is arrested by the projecting shoulder formed upon each of them coming against a portion of the boss.

In Figs. 1 and 2, the shafts $a$ and $c$ being concentric, either shaft can be driven from the other through the pawls and ratchet-teeth and the shafts will revolve at the same speed.

In Figs. 3 and 4, the shafts $a$ and $c$ being eccentric, the motion imparted from one shaft to the other will no longer be of the same velocity; but the velocity will be increased if motion is imparted from the shaft $a$ and will be decreased if imparted from the shaft $c$, because as the outer ends of the pawls come round to where the circumferences of the wheels are nearest together they are compelled to move inward toward the circumference of the boss $d$, and according as the outer ends of the pawls when in action and engaging with the ratchet-teeth are so moved nearer to the circumference of the boss so is the relative speed of the two axes varied.

Figure 6:
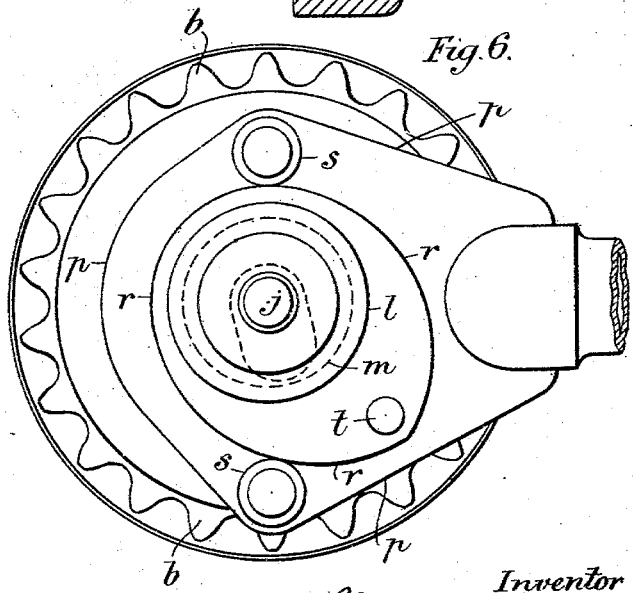

In Figs. 5 and 6 the boss $d$, which carries the pawls, is shown affixed to one end of the hub $g$ of the driving-wheel of a bicycle and the ratchet-wheel $b$ is free to be revolved around a ring of balls $h$, which can be brought either into a position concentric with the boss $d$ or can be raised so as to be eccentric to it. The hub $g$ revolves on a ball-bearing $i$ in the ordinary way around a fixed axle $j$. $k$ is a bush on the axle, by which the balls of this bearing are kept in place. $l$ is a nut screwing onto the axle and holding the bush in place. $m$ is a disk surrounding a portion of the bush and slotted, so that it can be raised or lowered. It is fitted to move easily between a flange on the bush and the nut $l$. The disk carries around it ball-races $n$ $o$, which are surrounded by the ring of balls $h$, which form the bearing for the ratchet-wheel $b$. $p$ is a plate, which serves as a nut to hold the ball-races $n$ $o$ in place. When screwed up, it is locked to the disk $m$ in any ordinary way. The wheel $b$ has projecting teeth on its outer circumference and forms the ordinary sprocket-wheel, which, as usual, is to be driven by an endless chain from a sprocket-wheel on the pedal-axis. $r$ is a cam free to turn around the exterior of the nut $l$. $s$ $s$ are two rollers carried by studs fixed upon the plate $p$. The cam is so shaped as to bear upon both of these rollers in whatever position it may be turned into. $t$ is a stud fixed upon the cam $r$. To this stud a cord may be attached, and by pulling the cord upward about a quarter-turn may be given to the cam and the disk $m$ thereby raised so as to bring the ratchet-wheel $b$ into a position eccentric to the boss $d$. When the cord is slackened, the cam may be brought back to its former position by the action of a spring.

Instead of raising the disk $m$ with the sprocket-wheel $b$ it may be lowered so that the pawls engage with the ratchet-teeth above the axle $j$ instead of below, as shown. In this case springs are provided, which force the pawls outward to engage with the ratchet-teeth. About thirty per cent. difference in the speeds at which the bicycle may be driven can thus be obtained.

Having now particularly described and ascertained the nature of my said invention and in what manner the same is to be performed, I declare that what I claim is—

1. In a variable-speed gear, the combination of two wheels of different diameter one within the other, ratchet-teeth formed on the inner circumference of the larger wheel, a number of pawls jointed to the circumference of the smaller wheel to engage with the ratchet-teeth and means for varying the distance between the axes of the two wheels.

2. In a variable-speed gear, the combination of two wheels of different diameter mounted with their axes parallel the larger one having ratchet-teeth formed thereon, a number of pawls jointed to the smaller wheel and engaging the ratchet-teeth, and means for varying the distance between the axes of the two wheels.

3. The combination of two wheels of different diameter one within the other, ratchet-teeth on the inner circumference of the larger wheel, a number of pawls jointed to the circumference of the smaller wheel, a hollow axle upon which the smaller wheel is fixed, a fixed axle passing through the hollow axle and around which the hollow axle can be revolved, a disk forming a bearing around which the larger wheel can be revolved, a slot in this disk through which the fixed axle passes and means for shifting the disk into positions more or less eccentric to the fixed axle.

4. The combination of two wheels of different diameter one within the other, ratchet-teeth on the inner circumference of the larger wheel, a number of pawls jointed to the circumference of the smaller wheel, a hollow axle upon which the smaller wheel is fixed, a fixed axle passing through the hollow axle and around which the hollow axle can be revolved, a disk forming a bearing around which the larger wheel can be revolved, a slot in this disk through which the fixed axle passes, two studs carried by this disk on opposite sides of its center, a cam-plate against which the two studs rest and which is capable of being turned around the fixed axle, and means for giving a partial turn to this cam to bring the disk into positions more or less eccentric to the fixed axle.

5. A pawl-and-ratchet-wheel arrangement of variable-speed gear comprising two wheels of different diameter one having ratchet-teeth thereon, pawls each having a semicylindrical end, fitting into a corresponding socket in the other wheel, and a countersunk hole therein, and a pin on the wheel passing through the countersunk hole in the pawl.

6. A pawl-and-ratchet-wheel arrangement of variable-speed gear comprising two wheels of different diameter one having ratchet-teeth thereon, pawls jointed to the other, and means for varying the distance between the axes of the two wheels, the wheels, pawls and ratchet-teeth being so related as set forth that as the wheels revolve each pawl comes in succession into a position in which it drives the driven wheel faster than any of the other pawls and continues to so drive it until the next succeeding pawl comes to the position in which it in turn can drive faster.

ALEXANDER GRAY.

Witnesses:
ROBERT B. RANSFORD,
JOHN H. WHITEHEAD.